(12) United States Patent
Voss

(10) Patent No.: US 9,038,984 B2
(45) Date of Patent: May 26, 2015

(54) SOLENOID VALVE, IN PARTICULAR FOR SLIP-CONTROLLED MOTOR VEHICLE BRAKING SYSTEMS

(75) Inventor: Christoph Voss, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 34 days.

(21) Appl. No.: 14/118,928

(22) PCT Filed: May 14, 2012

(86) PCT No.: PCT/EP2012/058857
§ 371 (c)(1),
(2), (4) Date: Nov. 20, 2013

(87) PCT Pub. No.: WO2012/159908
PCT Pub. Date: Nov. 29, 2012

(65) Prior Publication Data
US 2014/0084197 A1    Mar. 27, 2014

(30) Foreign Application Priority Data
May 26, 2011  (DE) .......................... 10 2011 076 556

(51) Int. Cl.
*F16K 31/06* (2006.01)
*B60T 8/36* (2006.01)
*B60T 15/02* (2006.01)

(52) U.S. Cl.
CPC ........... *F16K 31/0658* (2013.01); *B60T 8/3675* (2013.01); *B60T 15/028* (2013.01); *B60T 8/363* (2013.01)

(58) Field of Classification Search
CPC ...... B60T 8/363; B60T 8/3675; B60T 15/028
USPC ............. 251/30.01–30.05, 129.15; 303/119.2
See application file for complete search history.

(56) References Cited

U.S. PATENT DOCUMENTS

| | | | | |
|---|---|---|---|---|
| 5,704,587 A | * | 1/1998 | Kuromitsu et al. ...... | 251/129.15 |
| 5,735,582 A | * | 4/1998 | Eith et al. ................... | 303/119.2 |
| 5,810,330 A | * | 9/1998 | Eith et al. ................. | 251/129.19 |
| 5,865,213 A | * | 2/1999 | Scheffel et al. .......... | 137/614.16 |

(Continued)

FOREIGN PATENT DOCUMENTS

| | | |
|---|---|---|
| DE | 100 10 734 A1 | 9/2001 |
| DE | 10 2005 014 100 A1 | 2/2006 |

(Continued)

OTHER PUBLICATIONS

International Search Report for PCT/EP2012/058857 mailed Jul. 27, 2012.

(Continued)

*Primary Examiner* — John Bastianelli
(74) *Attorney, Agent, or Firm* — RatnerPrestia

(57) ABSTRACT

A solenoid valve, the magnet armature of which is designed to be movable relative to a first valve-closing element, for which purpose the first valve-closing element is accommodated telescopically in a coupling element attached to the magnet armature, wherein the coupling element is guided along the inner wall of a guide sleeve inserted in the valve housing in order to align the magnet armature precisely with the first valve-closing element in the direction of a second valve-closing element which is likewise accommodated in the guide sleeve.

10 Claims, 4 Drawing Sheets

(56) References Cited

U.S. PATENT DOCUMENTS

Figure 1:
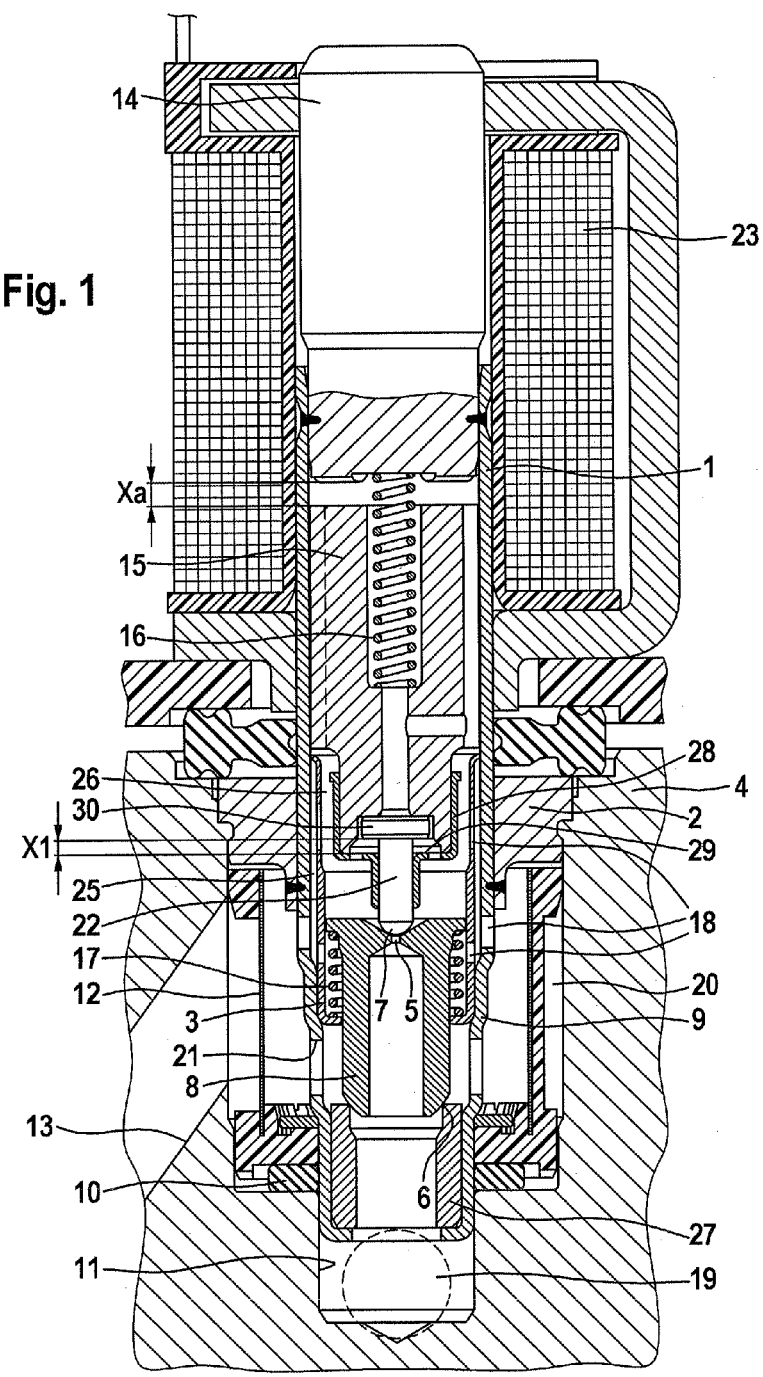

| | | | |
|---|---|---|---|
| 6,254,200 B1* | 7/2001 | Ganzel | 303/119.2 |
| 6,435,210 B1* | 8/2002 | Obersteiner et al. | 137/599.18 |
| 6,481,452 B2* | 11/2002 | Reuter et al. | 137/630.15 |
| 6,796,619 B1* | 9/2004 | Hinz et al. | 303/119.2 |
| 7,198,249 B2 | 4/2007 | Nakayasu | 251/30.04 |
| 2003/0213928 A1* | 11/2003 | Masuda et al. | 251/129.15 |
| 2008/0237524 A1* | 10/2008 | Lee | 251/324 |
| 2009/0095928 A1* | 4/2009 | Lee et al. | 251/129.15 |

FOREIGN PATENT DOCUMENTS

| | | |
|---|---|---|
| DE | 10 2005 030 957 A1 | 1/2007 |
| DE | 10 2007 026 358 A1 | 7/2008 |
| DE | 10 2008 020 855 A1 | 9/2009 |

OTHER PUBLICATIONS

German Search Report for 10 2011 076 556.5 dated Apr. 5, 2012.

* cited by examiner

SOLENOID VALVE, IN PARTICULAR FOR SLIP-CONTROLLED MOTOR VEHICLE BRAKING SYSTEMS

CROSS REFERENCE TO RELATED APPLICATIONS

This application is the U.S. National Phase Application of PCT/EP2012/058857, filed May 14, 2012, which claims priority to German Patent Application No. 10 2011 076 556.5, filed May 26, 2011, the contents of such applications being incorporated by reference herein.

FIELD OF THE INVENTION

The invention relates to a solenoid valve, in particular for slip-controlled motor vehicle braking systems.

BACKGROUND OF THE INVENTION

A solenoid valve of the type specified is known from DE 10 2005 014 100 A1, which is incorporated by reference, and has a plunger-type valve closing body accommodated in a relatively movable manner in a pot-shaped coupling element which is mounted on an extension of a magnet armature. Guidance of the magnet armature in a sleeve-shaped valve housing is effected over the full length of the magnet armature head, while the lower portion of the magnet armature, formed by the extension, the coupling element and the plunger-type valve closing body, is aligned, in a manner dependent on the accuracy with which the magnet armature head is guided inside the valve housing, with a further valve closing body which is received in a guide sleeve and carries a valve seat provided for the plunger-type valve closing body.

SUMMARY OF THE INVENTION

Therefore an aspect of the present invention implements a solenoid valve which is inexpensive and of small size using functionally appropriate means which are as simple as possible, and to improve said solenoid valve in such a way that the valve closing body accommodated in the coupling element is aligned as precisely as possible in the direction of its valve seat arranged in the further valve closing body.

This is achieved according to the invention for the solenoid valve, in particular for slip-controlled motor vehicle braking systems, comprising: a first and a second valve closing body arranged in a valve housing, which valve closing bodies, disposed coaxially in the valve housing, are able to open or close a first and a second valve orifice in a stroke-dependent manner; a magnet armature which forms with the first valve closing body an assembly which can be manipulated independently and which can be placed on the second valve closing body under the effect of a return spring, which valve closing body is accommodated in an axially movable manner within a guide sleeve fixed in the valve housing; a magnet core in the valve housing against which an end of the return spring oriented away from the assembly bears; a pressure medium inlet which opens into the valve housing and a pressure medium outlet, the first valve closing body being able to open or close the first valve orifice located in the second valve closing body as a function of the electromagnetic excitation of a valve coil, the clear cross section of which first valve orifice is smaller than that of the second valve orifice in the second valve closing body which is openable under the influence of a spring; and a substantially pot-shaped coupling element which is mounted on a magnet armature extension and in which the first valve closing body is received movably relative to the magnet armature, wherein the coupling element contacts zonally the inner wall of the guide sleeve.

DRAWINGS

Figure 2:
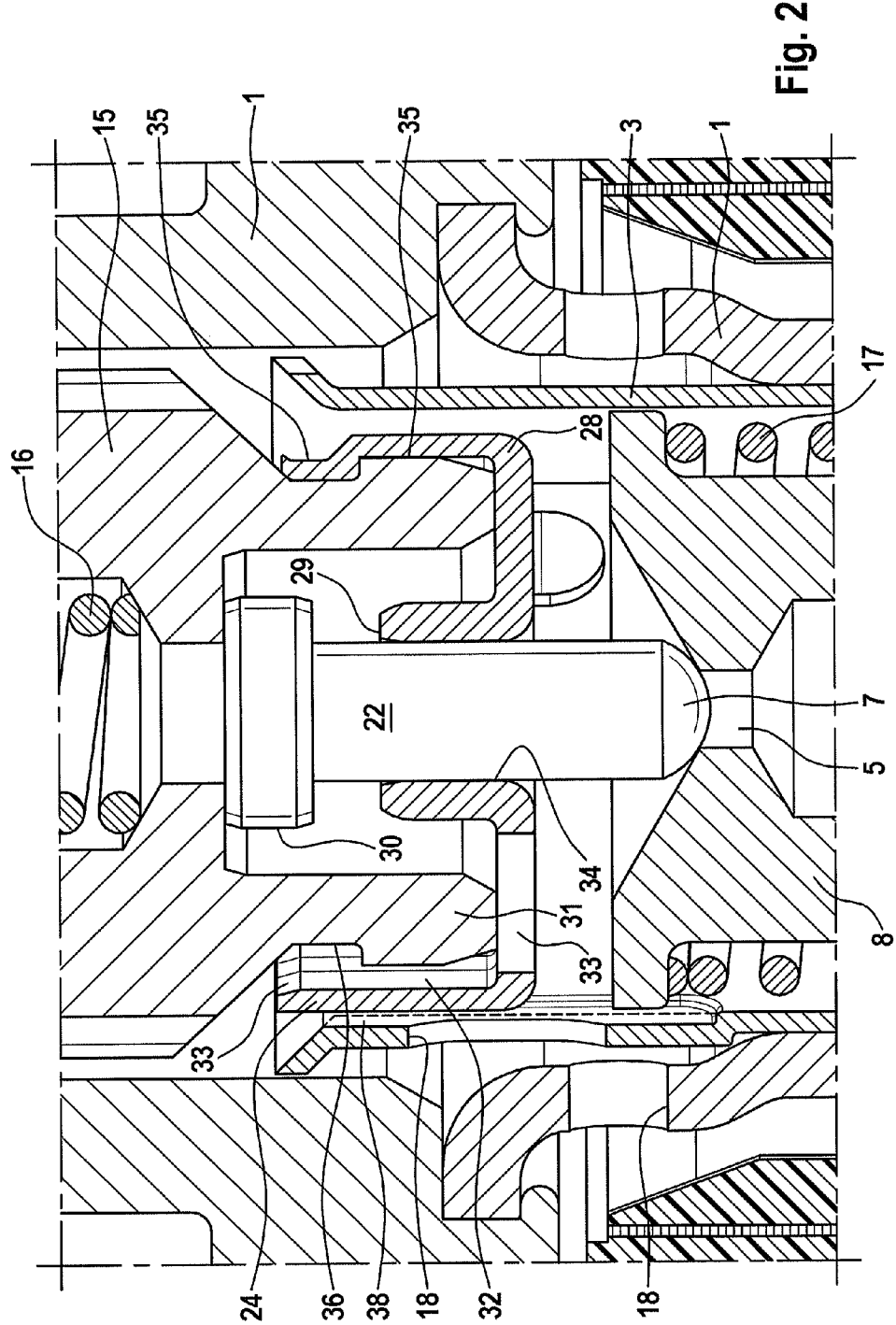
Figure 3:
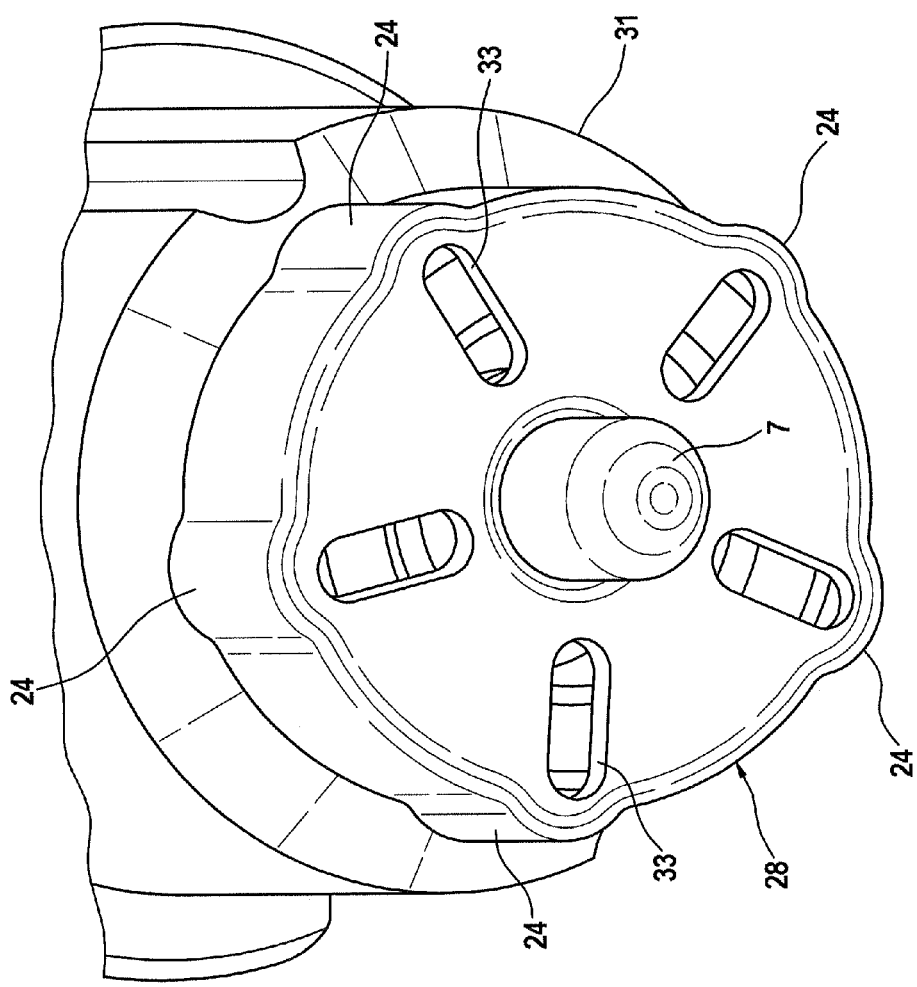
Figure 4:
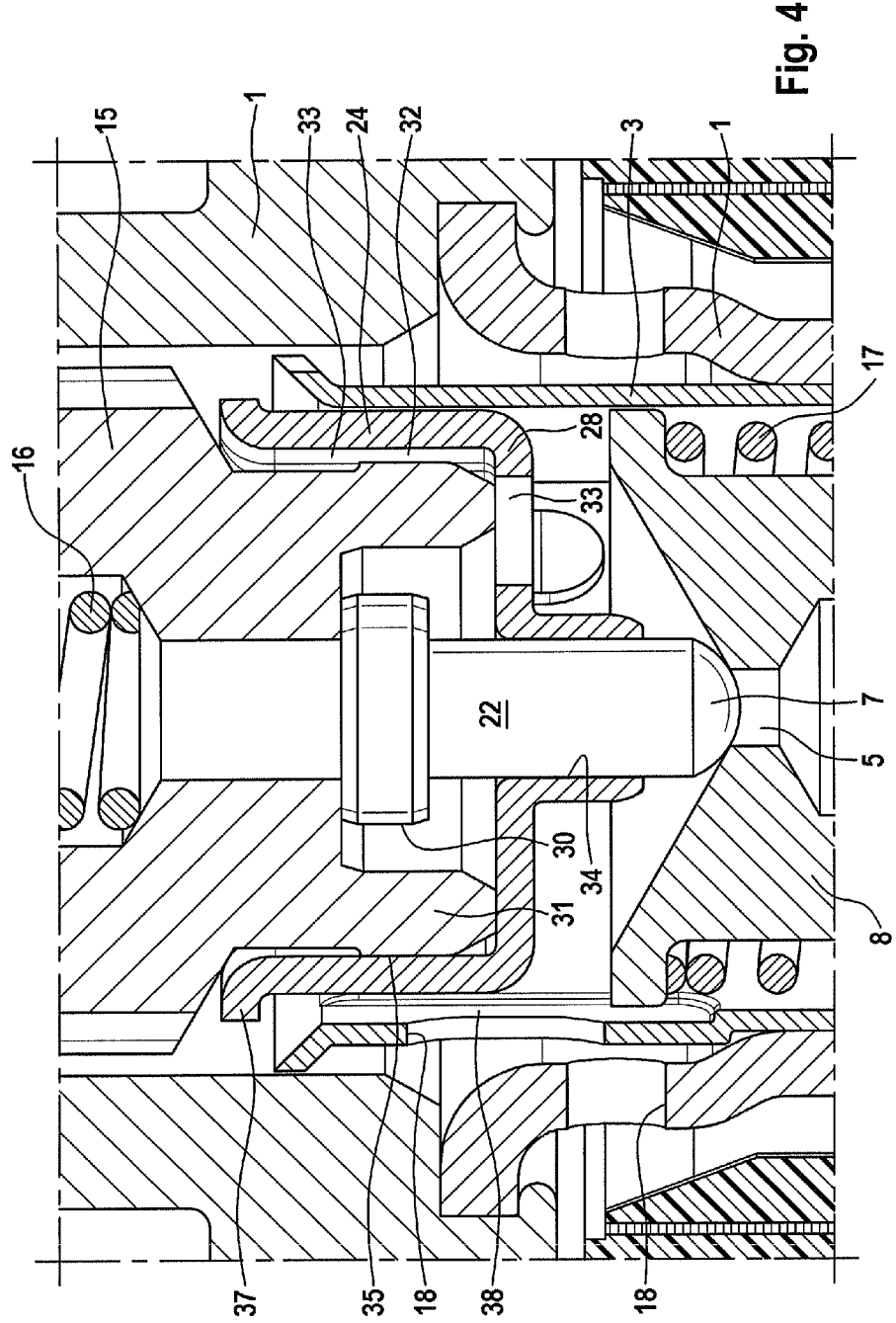

Further features and advantages of the invention are apparent from the following description of a number of exemplary embodiments. In the drawing:

FIG. 1 shows a general view in longitudinal section of a solenoid valve according to the prior art, having a first valve closing body guided in a coupling element, FIG. 2 shows a first modification according to the invention of the solenoid valve of FIG. 1 in the region of the coupling element and the guide sleeve, FIG. 3 shows a perspective view of the coupling element illustrated in FIG. 2, viewed from below, FIG. 4 shows a modification of the pot-shaped coupling element illustrated in FIG. 2 in the region of the edge and base of the pot.

DETAILED DESCRIPTION OF THE INVENTION

FIG. 1 shows in a considerably enlarged view and in longitudinal section a solenoid valve with a thin-walled, one-piece valve housing 1 produced in a deep-drawing process, which receives a separate retaining collar 2 which is fitted to the outer circumference of the valve housing and fastened by laser welding, and is produced by non-cutting shaping, for example as a cold-formed part. The substantially disk-shaped retaining collar 2 is configured as a caulking die on its outer circumference such that its circumferential undercut is pressed with the valve housing 1 into a stepped receiving bore of a block-shaped valve carrier 4, the soft material, of which is forced into the undercut by a pressing process for fixing and sealing purposes. Above the retaining collar 2, the open end section of the sleeve-shaped valve housing 1 is closed by a plug which at the same time assumes the function of a magnet core 14. The plug is also a cold-formed part which is produced at low cost with sufficient accuracy and is laser-welded by its outer circumference to the valve housing 1. A magnet armature 15, which likewise is produced at very low cost from a round or polygonal profile by cold forming or extrusion, is located below the plug. In the valve initial position, through the effect of a return spring 16, the magnet armature 15 closes with the first valve closing body 7, arranged in the extension of the magnet armature 15, a first valve orifice 5 arranged in a second valve closing body 8. For this purpose the first valve closing body 7 is suitably mounted on a plunger portion which is arranged movably in a stroke direction on the lower end face of the magnet armature 15, while the second valve closing body 8 is configured substantially as a sleeve-shaped valve piston and is subjected to the effect of a spring 17 which lifts the second valve closing body 8 from its valve seat body 27. For this purpose the spring 17 bears against an edge of the second valve closing body 8.

Through the effect of the return spring 16 on the first valve closing body 7, in the valve initial position illustrated the second valve closing body 8 closes a second valve orifice 6 provided in the lower end of the valve housing 1, the clear cross section of which valve orifice 6, openable as a function of the hydraulic differential pressure, is considerably larger than the electromagnetically openable clear cross section of the first valve orifice 5.

In order to receive and seal the valve housing 1 in the bore step 11, the valve housing 1 is reduced in diameter in the region of the bore step 11 and provided with a sealing ring 10, so that, between the valve housing 1 and the bore step 11, no leakage flow can be established between the pressure medium inlet 13, which opens laterally into the valve housing 1, and the pressure medium outlet 19 arranged below the valve housing 1. The pressure medium inlet 13, implemented substantially as an oblique passage in the valve carrier 4, is continued via the ring filter 12, located in the cavity 20 of the valve carrier 4, to the transverse bore 21 punched in the valve housing 1, so that pressure medium on the inlet side is available directly at the second valve closing body 8, the transverse bores 21 of which, arranged in the horizontal plane, ensure a low-resistance, deviation-free and therefore direct flow path to the second valve body 8. Likewise, a further flow path is formed via the transverse bores 18 to the first valve body 7.

The spring 17 is located outside the flow path by which the pressure medium inlet 13 is connectable to the pressure medium outlet 19, for which purpose the guide sleeve 3, against which the end of the spring 17 oriented away from the second valve closing body 8 bears, is inserted in the valve housing 1 remotely from the flow path. Consequently, the spring 17 is arranged on the guide sleeve 3 above the transverse bores 21. The guide sleeve 3 is supported against a housing step 9 in the valve housing 1. This housing step 9 is arranged above the transverse bore 21 which passes through the valve housing 1. The guide sleeve 3 is open in its pot base in such a way that the second valve closing body 8 can be guided and centered in this opening in the direction of the valve seat body 27. The lower end of the spring 17 bears against the pot base of the guide sleeve 3. The edge of the pot oriented away from its base is bent out towards the inner wall of the valve housing 1. An annular chamber 25, which establishes a permanent pressure-medium connection between the pressure medium inlet 13 and a magnet armature chamber 26 via pressure compensation openings 18 arranged in the valve housing 1 and on the circumference of the sleeve pot, is thereby produced between the outer cylindrical surface of the sleeve pot and the inner wall of the sleeve-shaped valve housing 1. The guide sleeve 3 and the valve housing 1 are each made of deep-drawn thin sheet metal in which the pressure compensation openings 18 are punched or impressed. This results in valve parts which are especially small and inexpensive and can be accurately produced.

The one-piece valve housing 1 is configured as a stepped, thin-walled drawn sleeve the open end of which oriented away from the second valve orifice 6 is closed by the magnet core 14. To relieve the mechanical stress on the valve housing 1, the second valve orifice 6 is provided in a ring-shaped or sleeve-shaped valve seat body 27 which is retained by a press fit against the inner wall of the valve housing 1. The valve seat body 27 is made of a wear-resistant metal. Its height is selected such that the second valve closing body 8 ends level with the diametrical transverse bores 21 of the valve housing The magnet armature 15 is configured to be movable relative to the first valve closing body 7, so that an electromagnetic actuation of the magnet armature 15 caused by the valve coil which is not impaired by the hydraulic closing force exerted by the first valve closing body 7 against the opening stroke Xa of the magnet armature 15 is advantageously ensured. In the simplest implementation, therefore, the first valve closing body 7 is coupled to the magnet armature 15 via a defined axial clearance.

In order to be able to lift the first valve closing body 7 after an initial partial stroke of the magnet armature a coupling element 28 is located on the magnet armature 15, which coupling element 28 holds the first valve closing body 7 on the magnet armature 15 while allowing relative movement within certain limits. The coupling element 28 is implemented preferably as a substantially pot-shaped sleeve which is fastened to the magnet armature 15 and has an annular abutment shoulder 29 through the opening of which the plunger portion 22 of the first valve closing body 7 extends in the direction of the second, piston-shaped valve closing body 8. Between the abutment shoulder 29 and a collar 30 on the plunger portion 22 there is provided a gap which can be bridged by the collar 30, in order to ensure relative movement between the magnet armature 15 and the valve closing body 7. The first valve closing body 7 thereby keeps the orifice 5 in the second valve closing body 8 initially closed at the start of the stroke of the magnet armature.

In the electromagnetically non-excited position of the valve, therefore, the collar 30 is at an axial distance X1 from the end of the sleeve of the coupling element 28, the axial distance X1 corresponding to the initial lift of the magnet armature as it is moved relative to the first valve closing body 7, during which lift the first valve closing body 7 remains on the second valve closing body 8 under the effect of various hydraulic pressures during the electromagnetic excitation of the magnet armature 15.

The coupling element 28 consists of a thin sheet metal element which is preferably produced in a deep-drawing process and is connected non-positively and/or positively to the magnet armature 15.

According to FIG. 1, the coupling element 28 is in the form of a pot-shaped sleeve. Depending on the pressed depth of the coupling element 28 on the lower extension of the magnet armature 15, the adjustable axial distance X1, which defines the desired relative movement between the magnet armature 15 and the first valve closing body 7, remains between the base of the pot-shaped sleeve and the collar 30.

Operation of the Solenoid Valve:

In the electromagnetically non-excited valve position illustrated, both valve closing bodies 7, 8 adopt their valve closing positions as a result of the closing force of the return spring 16, the spring force of which is dimensioned greater than the force of the counter-acting spring 17.

Assuming that equal hydraulic pressures prevail in the pressure medium inlet 13 and the pressure medium outlet 19, upon being electromagnetically excited the magnet armature 15 covers a stroke, up to abutment with the magnet core 14, which corresponds to the maximum lift of the second valve closing body 8. Since the effect of the return spring 16 on the valve closing bodies 7, 8 is cancelled during electromagnetic excitation as a result of the arrangement of the return spring 16 remote from the collar 30, the two valve closing bodies 7, 8, abutting one another, move synchronously with the magnet armature movement as a result of the action of the spring 17, so that the maximum cross section at the valve orifice 6 is opened immediately after electromagnetic excitation has occurred.

If the pressure in the pressure medium inlet 13 is greater than the hydraulic pressure at the pressure medium outlet 19, however, the effect of the spring 17 on the second valve closing body 8 is reduced by the amount of force resulting from the hydraulic loading of the second valve closing body 8. Accordingly, the reaction of the spring 17 on the first valve closing body 7 which, in addition to the effect of the return spring 16, is loaded in the closing direction through the effect of the hydraulic pressure difference, is reduced or eliminated.

If an electromagnetically initiated stroke movement of the magnet armature 15 now takes place under the conditions described, the magnet armature 15 first covers the axial distance X1 up to abutment with the shoulder 29 on the collar 30, corresponding to a partial stroke of the magnet armature 15, while compressing the return spring 16. During this partial stroke, therefore, the first valve closing body 7, which is not hydraulically pressure-compensated, remains in the closed position illustrated, resting against the second valve closing body 8 under the effect of the hydraulic pressure. At the moment when the shoulder 29 of the coupling element 28 contacts the collar 30 as a result of the relative movement of the magnet armature 15 with respect to the first valve closing body 7, the distance of the magnet armature 15 from the magnet core 14 has already been reduced by the partial stroke X1 to a minimum, so that only a small electromagnetic excitation is advantageously required in order to bridge the remaining minimal air gap between magnet core and magnet armature and to lift the first valve closing body 7 from the valve orifice 5.

The first valve closing body 7 is therefore lifted via the coupling element 28 only shortly before the magnet armature 15 reaches the magnet core 14, whereby the first valve closing body 7 is moved away from the second valve closing body 8 and opens the stop-like valve orifice 5. This creates in a comparatively simple manner the precondition for the second valve closing body 8, assisted by the spring 17, to open the large, throttle-free cross section of the valve orifice 6 as soon as hydraulic pressure compensation is ensured via the valve orifice 5.

In order now to make possible a guidance of the magnet armature 15 which is as precise and free of resistance as possible, and to center the first valve closing body 7 with respect to its valve seat (valve orifice 5) integrated in the second valve closing body 8, it can be seen in FIG. 2, in deviation from FIG. 1, that, according to the invention, the coupling element 28 fastened to a slender magnet armature extension 31 contacts the inner wall of the guide sleeve 3 zonally in a slideable manner, for which purpose, as shown in the perspective view in FIG. 3, the coupling element 28 has a plurality of radial projections 24 which are distributed uniformly over its lateral surface and contact the inner wall of the guide sleeve 3 in a slideable manner.

The radial projections 24 extend as lands aligned axially parallel to the magnet armature 15 over the full wall height of the pot-shaped coupling element 28, a gap 32 for the passage of pressure medium being provided between the projections 24 and the wall section of the magnet armature extension 31 covered by the coupling element 28. This gap 32 is hydraulically connected to a plurality of pressure compensation openings 33 provided in the base of the pot-shaped coupling element 28 and at the upper pot edge of the coupling element 28.

As is apparent from FIG. 3, the pressure compensation openings 33 provided in the base of the pot-shaped coupling element 28 are distributed in a stellar formation around a central opening 34 provided to receive the first valve closing body 7 in the end face of the base (abutment shoulder 29). The lateral surface 35 of the coupling element 28 arranged between the projections 24 contacts the lateral surface of the magnet armature extension 31 in an especially simple manner by means of a press fit.

The contour of the lateral surface 35 of the coupling element arranged between the projections 24 is clearly apparent from FIG. 3, which contour, as shown in the sectional representation in FIG. 2, engages with a positive and/or frictional connection in a groove 36 provided in the magnet armature extension 31 by means of a partial radial deformation at the upper pot edge of the coupling element 28.

The invention represented in FIGS. 2 to 4 is further distinguished by the fact that, advantageously, only the lateral surface 35 of the coupling element 28 arranged between the projections 24 is expanded briefly under radial preload as the coupling element 28 is pressed onto the magnet armature extension 31, for which purpose, in the constructional implementation as shown in FIG. 4, the upper pot edge of the coupling element 28 has a stiffening element produced by a collar 37 bent radially outwards which acts against the radial expansion. It is thereby achieved that, after the coupling element 28 has been pressed onto the magnet armature extension 31, the expanded wall section of the lateral surface 35 springs back radially in the direction of the magnet armature extension 31.

As is clearly apparent from FIGS. 2 and 4, a plurality of impressed depressions 38 are provided around the circumference of the inner wall of the guide sleeve 3, which depressions 38 are adapted, in the form of longitudinal grooves, to the outer contour of the projections 24 in order to receive and guide translationally the projections 24, so that especially precise overall guidance of the coupling element 28 inside the guide sleeve 3 is effected.

To the extent that not all the details visible in the drawing have been discussed with reference to the embodiments according to FIGS. 2 to 4, these details can be understood from the description relating to FIG. 1.

To sum up, the invention therefore relates to a solenoid valve of compact construction the magnet armature 15 of which is configured to be axially movable relative to the first valve closing body 7, for which purpose the first valve closing body is received telescopically in the coupling element 28 mounted on the magnet armature 15, which coupling element 28 is guided along the inner wall of the guide sleeve 3 inserted in the valve housing 1 in order to align the magnet armature 15, together with the first valve closing body 7, precisely in the direction of the valve seat (valve orifice 5) provided in the second valve closing body 8.

The solenoid valve which has been presented preferably finds application in slip-controlled motor vehicle braking systems designed according to the recirculation principle. Especially with the use of a stepped piston pump with correspondingly high suction in a motor vehicle braking system provided with dynamic stability control, undesired throttling of the suction of the stepped piston pump is reliably avoided through the use of the solenoid valve presented.

LIST OF REFERENCES

1 Valve housing
2 Retaining collar
3 Guide sleeve
4 Valve carrier
5 Valve orifice
6 Valve orifice
7 Valve closing body
8 Valve closing body
9 Housing step
10 Sealing ring
11 Bore step
12 Ring filter
13 Pressure medium inlet
14 Magnet core
15 Magnet armature
16 Return spring
17 Spring
18 Pressure compensation opening
19 Pressure medium outlet
20 Cavity
21 Transverse bore
22 Plunger portion
23 Valve coil 24 Projection
25 Annular chamber
26 Magnet armature chamber
27 Valve seat body
28 Coupling element
29 Abutment shoulder
30 Collar
31 Magnet armature extension
32 Gap
33 Pressure compensation opening
34 Central opening
35 Lateral surface
36 Groove
37 Collar
38 Depression

The invention claimed is:

1. A solenoid valve, for slip-controlled motor vehicle braking systems, comprising:
   a first and a second valve closing body arranged in a valve housing, which valve closing bodies, disposed coaxially in the valve housing, are able to open or close a first and a second valve orifice in a stroke-dependent manner; a magnet armature which forms with the first valve closing body an assembly which can be manipulated independently and which can be placed on the second valve closing body under the effect of a return spring, the second valve closing body is accommodated in an axially movable manner within a guide sleeve fixed in the valve housing;
   a magnet core in the valve housing against which an end of the return spring oriented away from the assembly bears;
   a pressure medium inlet which opens into the valve housing and a pressure medium outlet, the first valve closing body being able to open or close the first valve orifice located in the second valve closing body as a function of the electromagnetic excitation of a valve coil, the clear cross section of the first valve orifice is smaller than that of the second valve orifice in the second valve closing body which is openable under the influence of a spring; and
   a substantially pot-shaped coupling element which is mounted on a magnet armature extension and in which the first valve closing body is received movably relative to the magnet armature, wherein the coupling element contacts zonally an inner wall of the guide sleeve.

2. The solenoid valve as claimed in claim 1, wherein the coupling element has a plurality of radial projections which are distributed uniformly around its lateral surface and which contact the inner wall of the guide sleeve in a slidable manner.

3. The solenoid valve as claimed in claim 2, wherein the radial projections extend over the full wall height of the pot-shaped coupling element as lands aligned axially parallel to the magnet armature, and a gap for the passage of pressure medium is provided between the projections and the wall section of the magnet armature extension covered by the coupling element.

4. The solenoid valve as claimed in claim 3, wherein the gap is connected hydraulically to a plurality of pressure compensation openings provided in the base of the pot-shaped coupling element and at the upper pot edge of the coupling element.

5. The solenoid valve as claimed in claim 4, wherein the pressure compensation openings provided in the base of the pot-shaped coupling element are distributed in a stellar formation around a central opening in the end face of the base which is provided to receive the first valve closing body.

6. The solenoid valve as claimed in claim 2, wherein the lateral surface of the coupling element arranged between the projections is retained on the magnet armature extension by a press fit.

7. The solenoid valve as claimed in claim 6, wherein the lateral surface of the coupling element arranged between the projections is secured by positive and/or frictional engagement in a groove provided in the magnet armature extension by a partial radial deformation of the lateral surface at the upper pot edge of the coupling element.

8. The solenoid valve as claimed in claim 6, wherein only the lateral surface of the coupling element extending between the projections is expanded under radial preload as the coupling element is pressed onto the magnet armature extension.

9. The solenoid valve as claimed in claim 4, wherein the upper pot edge of the coupling element has for stiffening a radially outwardly oriented collar which ensures that the wall section springs back radially in the direction of the magnet armature extension after the coupling element has been pressed onto the magnet armature extension.

10. The solenoid valve as claimed in claim 2, wherein a plurality of depressions are provided around the circumference of the inner wall of the guide sleeve and are adapted, in the form of longitudinal grooves, to the outer contour of the projections in order to receive and translationally guide the projections.

* * * * *